United States Patent [19]

Tolfsen

[11] 4,035,595
[45] July 12, 1977

[54] ELECTRICAL SWITCH FOR SAFETY BELT LOCKING DEVICES

[75] Inventor: Ulf Tolfsen, Gralum, Norway

[73] Assignee: Loyd's Industri A/S, Fredrikstad, Norway

[21] Appl. No.: 632,800

[22] Filed: Nov. 17, 1975

[51] Int. Cl.² .............. H01H 27/00; A44B 11/00; A62B 35/00

[52] U.S. Cl. .............. 200/61.58 B; 24/241 R; 200/61.19; 294/83 R

[58] Field of Search .............. 200/61.19, 61.58 R, 200/61.58 B, 153 M; 294/83; 297/385–388; 24/201 R, 201 LP, 203 SB, 241 R, 241 S, 241 P, 241 PP, 241 PL, 241 PS, 241 SP, 241 SB, DIG. 31; 307/10 SB

[56] References Cited

U.S. PATENT DOCUMENTS

| | | | |
|---|---|---|---|
| 2,758,867 | 8/1956 | Elsner | 294/83 |
| 3,920,265 | 11/1975 | Nilsson | 24/241 PS X |

FOREIGN PATENT DOCUMENTS

| | | | |
|---|---|---|---|
| 839,629 | 6/1960 | United Kingdom | 294/83 R |

*Primary Examiner*—James R. Scott
*Attorney, Agent, or Firm*—Browdy and Neimark

[57] ABSTRACT

The invention relates to a locking device for safety belts of the type having a switch assembly where the belt is passed downwardly over a locking bar for locking and where the locking bar, on activation of a releaser is tipped upwardly. The locking device is connected to an electric signal circuit which gives a warning signal if the safety belt is not employed. The electric connection for the signal circuit is arranged on the locking device. The circuit is connected when the locking bar is open, and broken when the locking bar is pressed down. The locking bar forms in the downward position an electrically conductive connection to a contact point, and the connection is broken when the safety belt is placed around the locking bar.

3 Claims, 6 Drawing Figures

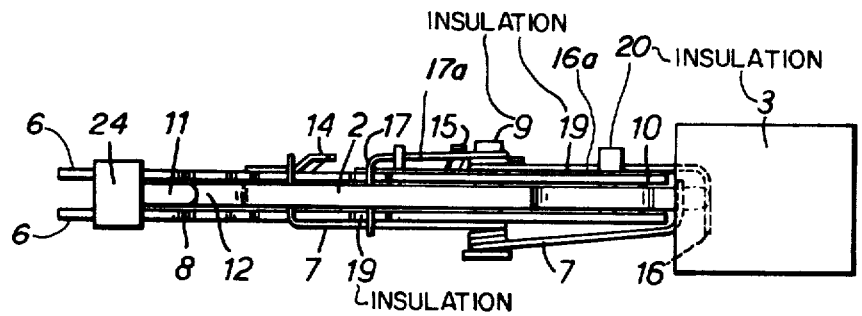
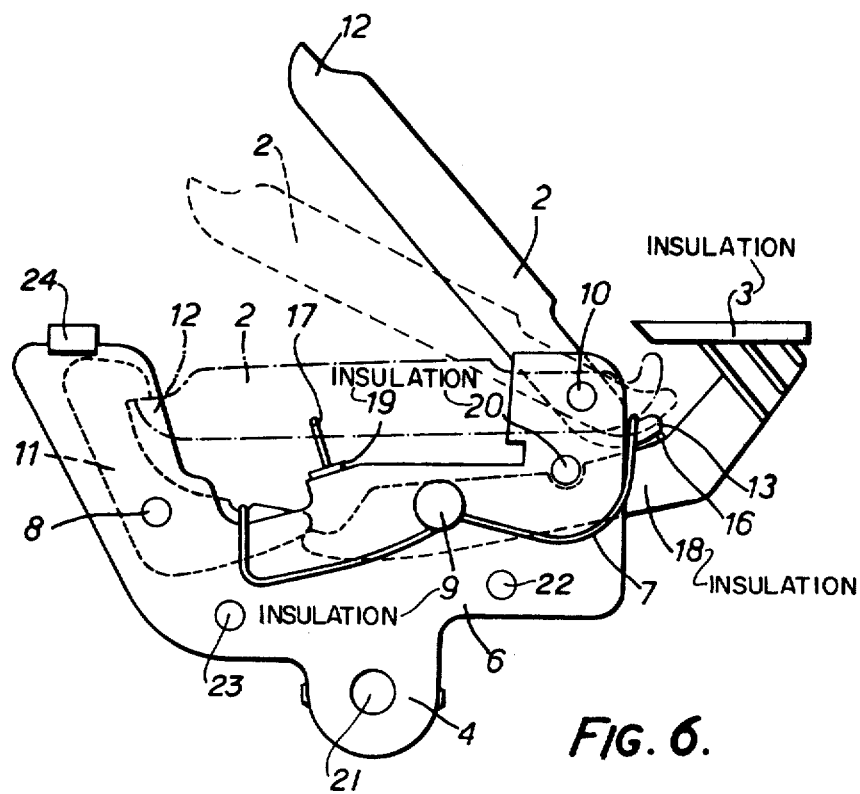

4,035,595

ELECTRICAL SWITCH FOR SAFETY BELT LOCKING DEVICES

FIELD OF THE INVENTION

This invention relates to locking devices for safety belts in which the belt is releasably secured to a locking bar of the device and in which the locking bar, on actuation of a release member, is moved to a release position, the device being intended for use with an electrical alarm circuit which gives warning if the safety belt is not employed.

DESCRIPTION OF THE PRIOR ART

Locking devices of this type are known, for example, from Swedish Pat. Specification No. 313508 and Norwegian Pat. Specification No. 121367.

In recent years, the importance of using safety belts in cars has become increasingly clear, and it is of great importance, therefore, to provide warning systems in cars which indicate that the belt must be employed. Such warning systems have been developed to the point where it is impossible to start the engine of the car before the safety belt has been fastened. According to ECE (The European Commision on Car Safety Questions) this is not a very favourable or desirable solution. (This system is used primarily in the U.S.A.). Common to most warning systems, however, are the relatively expensive micro switches which must be used in the lock.

SUMMARY OF THE INVENTION

The object of the present invention is therefore to provide an improvement in locking devices of the type described hereinabove, where the improvement is based on the function and construction of the lock and thus constitutes an integrated part thereof in contrast to a micro switch arrangement which can be described as being "tacked on" and is difficult to mount suitably in consideration of the requirements as to size and design of the lock. A locking device according to the present invention can be incorporated in the warning system of the car.

According to the invention a locking device for releasably securing one end of a safety belt comprises a locking bar movable between a release position in which one end of the belt can be engaged with or separated from the locking bar and a locking position in which that end of the belt is secured to the locking device, a release member, the actuation of which, releases the locking bar from the locking position and frees it for movement to the release position. The locking device has two electrical terminals for connection to an electrical alarm circuit. The two terminals are electrically short circuited when the locking bar is in the release position or in the locking position without securement of the safety belt to the locking bar. The two terminals are electrically open circuited when the locking bar is in the locking position and secures the safety belt. The two terminals are open circuited as a result of the interruption of the electrical interconnection between the terminals by the interposition of the insulating material of the belt between the locking bar and an electrical contact member with which the locking bar makes electrical contact when in the locking position in the absence of the belt.

By means of the improvement according to the invention, a very simple, inexpensive and reliable locking device is obtained which, on connection to the electrical alarm circuit, transmits a signal if the safety belt is not placed in the lock, and is automatically disconnected on securement of the belt.

BRIEF DESCRIPTION OF THE DRAWINGS

A locking device according to the invention will now be described, by way of example, with reference to the accompanying drawings, in which:

FIG. 5 shows the internal detail of FIG. 3 seen from above, and FIG. 6 is a side view similar to that of FIG. 4, but showing the locking bar in the release position, concealed parts being drawn in dotted lines, the locking position being indicated in chain dotted lines, and the intermediate position in dashed lines.

DETAILED DESCRIPTION OF THE PREFERRED EMBODIMENTS

Figure 1:
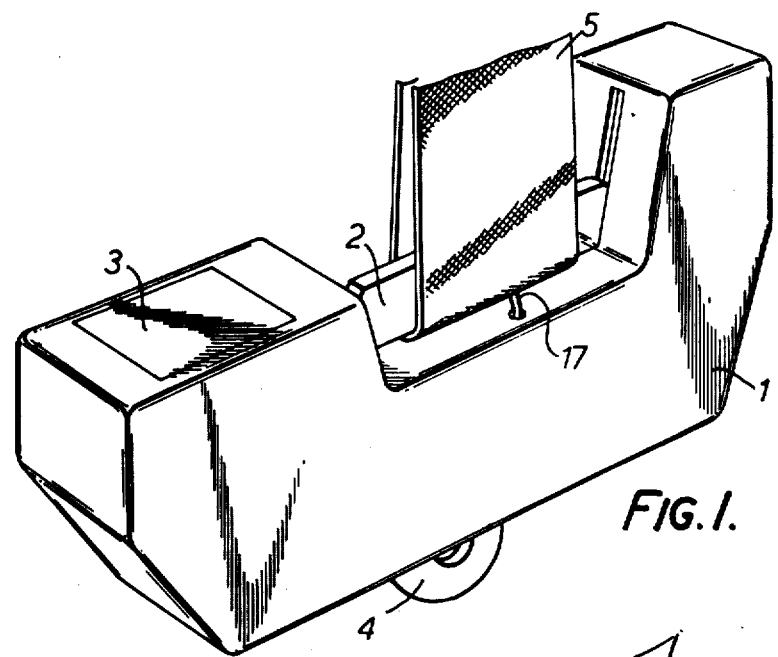
FIG. 1 is a perspective view of the locking device.
Figure 2:
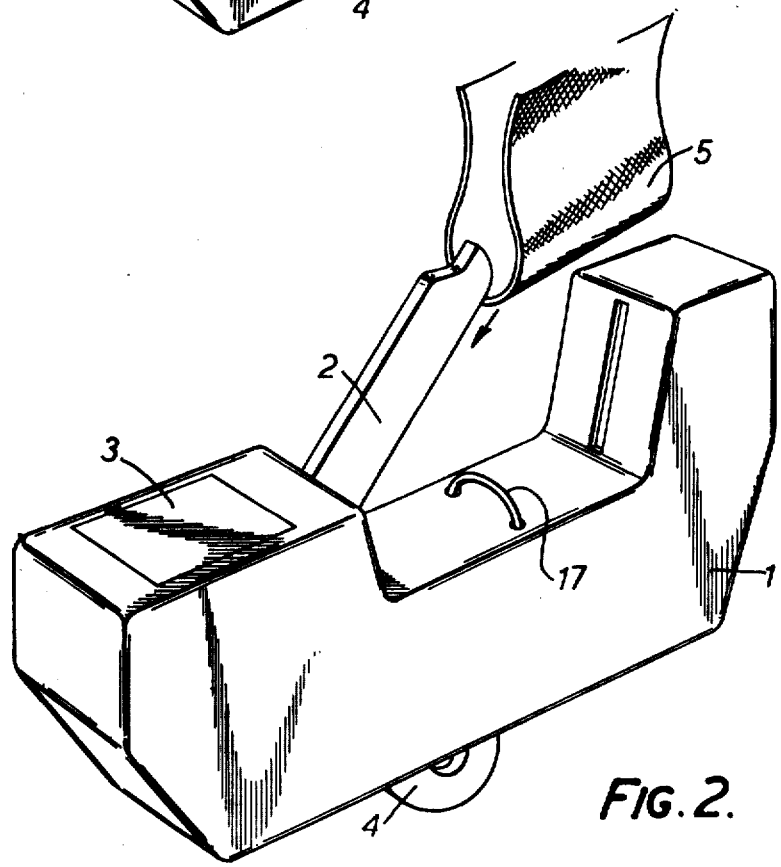
FIG. 2 is a view similar to that of FIG. 1, but showing a locking bar of the device in a release position.

Referring to FIGS. 1 and 2, the actual locking means of the device is enclosed by a housing 1 and is actuated by a locking bar 2 which may be released so that it pivots upwardly to a release position, as illustrated in FIG. 2, by pressure on a release botton 3 made of an insulating material. To secure the safety belt, a loop 5 of the latter is disposed around the locking bar 2, as indicated in FIG. 2, whereafter the locking bar is depressed manually and is retained in a lower or locking position, so that the safety belt is securely retained by the locking bar 2, as illustrated in FIG. 1. The safety belt is of the form which is secured at three spaced locations, at one of which the present locking device is located.

The locking means, as shown in FIGS. 3–6, comprises a main support structure 6 having two spaced and interconnected side plates, for example of steel, between which the locking bar 2 is rotatably secured by means of a pivot bearing 10. In the lower, locking position, the locking bar 2 is locked by means of a locking arm 11 pivotally mounted in the structure 6 about a pivot bearing 8. The pivot pins 10 and 8 also function as connection pins for the plates 6, as well as the connecting pins 22 and 23. Connecting piece 24, made of steel or plastic, also connects the plates 6. The locking arm 2 is in contact with an arm 18, made of an insulating material, attached to the release button 3, the arm 18 being pivotally mounted in the structure 6 about a pivot bearing 9 made of an insulating material. On pressing the release button 3, the arm 18 is rotated and actuates the locking arm 11, so as to release the locking bar 2. The locking bar 2 is acted on by a spring 7 which is also secured to the bearing 9, the spring 7 biasing the locking bar 2 to the upper, release position. The locking arm 11, in the locking position of the bar 2, is in engagement with a catch 12 on the locking bar 2. The spring 7 is secured around the other end 13 of the locking bar 2. The structure 6 is also provided with two lugs 4 projecting from the housing 1 and serving to secure the locking device to the body of a motor vehicle by suitable securing means. A hole 21 is provided in the lugs 4 for connection of such securing means.

An electrical alarm circuit is connected to two terminals 14 and 15 on the locking device. The terminal 14 is connected, through the pin 23 joining the locking means, to the material of the structure 6 and is thereby in electrically conductive connection with the locking bar 2. The terminal 15, the positive terminal, is mounted on the bearing 9 which can be of a plastics material and is thus insulated from the structure 6. The locking bar 2 may be made of metal or have a current-conducting wire embedded therein. From the terminal 15, a wire 16a, 17a leads in one direction to a resilient contact 16 disposed beneath the end 13 of the locking arm 2 and in the other direction to a curved spring contact 17 which projects from the housing 1 beneath the locking bar 2.

The terminal 15 and the wire 16a, 17a terminating in the contacts 16 and 17 are insulated from the structure 6 by a plate or coating of insulating material 19 and secured thereto in addition to the bearing 9. The contact 16 is held against upward movement by a pin 20, the main function of which is to act as a stop and braking pin for the release arm 18. The pin 20 is part of the insulation plate 19, and is also made of an insulating material.

Figure 3:
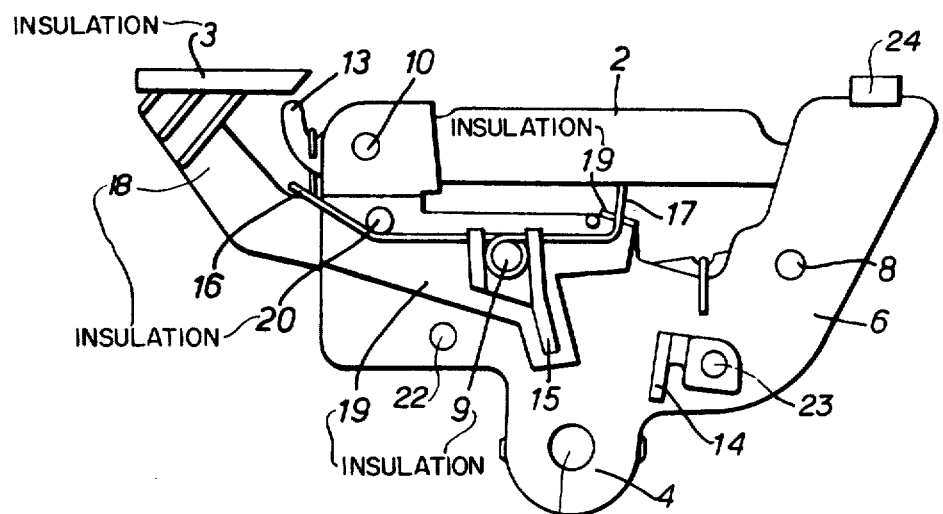
FIG. 3 is a side elevation of the internal detail of the device.
Figure 4:
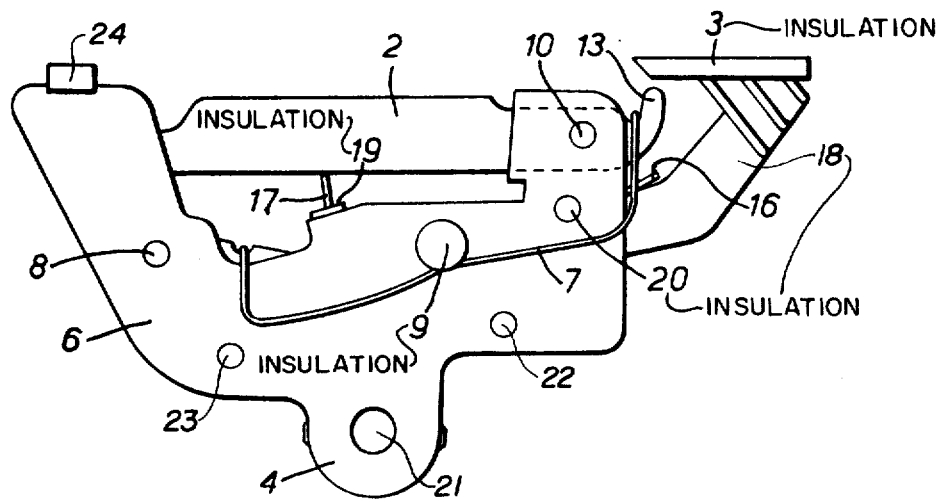
FIG. 4 shows the internal detail of FIG. 3 viewed from the opposite side.

The locking device functions in the following manner: the electrical alarm circuit of the motor vehicle is connected to the terminals 14 and 15. If, for example, the vehicle's ignition is now turned on, current is also applied to the electrical alarm circuit. If the locking bar 2 is then pressed downwardly into the locking position, as illustrated in FIGS. 3 and 4, and in broken lines in FIG. 6, the spring contact 17 will be in electrical contact with the locking bar 2. Current then passes from the terminal 14 through the structure 6, the bearing 10, the locking bar 2 and the contact 17 to the terminal 15. (The locking bar 2 is also in electrical contact with the structure 6 in that the catch 12 engages the locking arm 11). The alarm circuit is thereby closed and a warning signal to use the safety belt is generated either in the form of a light signal or sound signal.

If the locking device is opened by downward pressure on the release button 3, the locking bar 2 pivots upwardly, and electrical connection with the contact 17 is broken. The device is then in the position illustrated in FIG. 6. Current from the terminal 14 is transmitted, in the same manner, to the terminal 15 through the rear portion 13 of the locking bar 2 and the contact 16. The terminals 14 and 15 are again in electrical communication and the warning signal is given.

Only in the intermediate position, shown in FIG. 6, is the bar 2 not in contact either with contacts 16 or 17. The circuit is then disconnected. But the bar will not remain in such position because of the action of spring 7.

If the safety belt is then guided onto the locking bar 2, as illustrated in FIG. 2, and the locking bar 2 is pressed downwardly to the locking position illustrated in FIG. 1. The conditions are then as described previously for the locking position except that the belt is now disposed between the locking bar 2 and the contact 17. The belt is not conductive and thus insulates the locking bar 2 from the contact 17, so that there is no contact at this location. Similarly, there is no contact between the end 13 of the locking bar and the contact 16 so that electrical connection between the terminals 14 and 15 is broken. No warning signal is given, therefore, since the belt is securely fastened and the vehicle is ready for driving.

Safety belts employed today are all made of plastics materials and thus constitute good electric insulators. Experiments have shown that the belt insulates against current passage also in wet state.

Having described my invention, I claim:

1. In a locking device for releasably securing one end of a safety belt, having a main support structure of two parallel plates, a locking bar pivotably mounted on a locking bar pivot pin between the plates to engage one end of the safety belt in the locking device, a locking arm pivotably mounted between the plates to hold the locking bar in the locked position, a release bar pivotably mounted between the plates on a release pivot pin for releasing the locking bar from the locked position, and a spring that causes the locking bar to normally remain in the fully open position when it has been released from the locked position, the improvement wherein an electrical switch comprises:

an insulating plate mounted to one of the structural plates;
   two electrical terminals, the first terminal being mounted to said insulating plate, the second terminal being mounted to one of said structural plates;
   a wire mounted on said insulating plate connected to said first terminal;
   a first contact formed at one end of said wire, said first contact making electrical contact with the locking bar when the locking bar is in the locked position; and
   a second contact formed at the other end of said wire, said second contact making electrical contact with the locking bar when the locking bar is in the fully open position;
   whereby said electrical switch is closed when the locking bar is in the locked position through a closed electrical circuit through said first terminal, said wire, said first contact, the locking bar, the locking bar pivot pin, the structural plate, and said second terminal; and said electrical switch is closed when the locking bar is in the fully open position through a closed electrical circuit through said first terminal, said wire, said second contact, the locking bar, the locking bar first pin, the structural plate, and said second terminal; and said electrical switch is open when the locking bar engages an insulating safety belt in the locked position, the safety belt breaking the electrical contact between the locking bar and said first contact.

2. A locking device as claimed in claim 1, wherein the release bar, the release bar pivot pin, the safety belt, and said insulating plate are made of electrically insulating material.

3. A locking device as claimed in claim 1, wherein a signaling device is connected to said first and second terminals whereby a warning signal is produced when said electrical switch is closed to indicate that the safety belt has not been fastened.

* * * * *